US010780890B2

(12) United States Patent
McGill

(10) Patent No.: US 10,780,890 B2
(45) Date of Patent: Sep. 22, 2020

(54) VEHICLE SYSTEMS AND METHODS FOR DETECTING AND MITIGATING AN INCAPACITATED DRIVER

(71) Applicant: Toyota Research Institute, Inc., Los Altos, CA (US)

(72) Inventor: Stephen G. McGill, Broomall, PA (US)

(73) Assignee: Toyota Research Institute, Inc., Los Altos, CA (US)

( * ) Notice: Subject to any disclaimer, the term of this patent is extended or adjusted under 35 U.S.C. 154(b) by 368 days.

(21) Appl. No.: 15/861,009

(22) Filed: Jan. 3, 2018

(65) Prior Publication Data

US 2019/0202464 A1 Jul. 4, 2019

(51) Int. Cl.
*B60W 40/08* (2012.01)
*G06K 9/00* (2006.01)
(Continued)

(52) U.S. Cl.
CPC ........ *B60W 40/08* (2013.01); *B60W 50/0098* (2013.01); *G05D 1/0061* (2013.01);
(Continued)

(58) Field of Classification Search
CPC ............. B60W 40/08; B60W 50/0098; B60W 2050/0095; B60W 2040/0818; B60W 2040/0872; B60W 2540/26; B60W 30/182
See application file for complete search history.

(56) References Cited

U.S. PATENT DOCUMENTS 6,060,989 A * 5/2000 Gehlot ................. B60K 28/066
180/272
7,859,877 B2 * 12/2010 Mondaeev ............. G11C 15/00
365/49.1
(Continued)

FOREIGN PATENT DOCUMENTS

WO 2015134376 A1 9/2015

OTHER PUBLICATIONS

"Development of an automated vehicle stop system for cardiac emergencies" http://www.astesj.com/publications/ASTESJ_020385.pdf Accessed/Published: Jun. 5, 2017.
(Continued)

*Primary Examiner* — Michael J Zanelli
(74) *Attorney, Agent, or Firm* — Dinsmore & Shohl LLP

(57) ABSTRACT

Vehicle systems and methods for controlling a vehicle to mitigate the effects of an incapacitated driver are disclosed. In one embodiment, a vehicle includes one or more sensors, one or more processors, and one or more non-transitory memory modules communicatively coupled to the one or more processors. The memory modules store machine-readable instructions that, when executed, cause the one or more processors to receive one or more signals output by the one or more sensors and determine a driver of the vehicle is incapacitated based on the one or more signals output by the one or sensors. In response to determining the driver is incapacitated, the processors are caused to determine a specific type of incapacitation of the driver based on the one or more signals output by the one or more sensors. The processors may select an individual vehicle control profile based on the specific type of incapacitation.

18 Claims, 3 Drawing Sheets

(51) Int. Cl.
*G05D 1/00* (2006.01)
*B60W 50/00* (2006.01)

(52) U.S. Cl.
CPC . *G06K 9/00845* (2013.01); *B60W 2040/0818* (2013.01); *B60W 2040/0872* (2013.01); *B60W 2050/0095* (2013.01)

(56) References Cited

U.S. PATENT DOCUMENTS

| | | | |
|---|---|---|---|
| 8,725,311 B1* | 5/2014 | Breed | A61B 5/163 |
| | | | 701/1 |
| 9,290,174 B1 | 3/2016 | Zagorski | |
| 9,308,879 B2 | 4/2016 | Wright | |
| 9,440,657 B1 | 9/2016 | Fields et al. | |
| 9,505,402 B2 | 11/2016 | Fung | |
| 9,676,395 B2 | 6/2017 | Siddiqui et al. | |
| 9,682,711 B2 | 6/2017 | Lee | |
| 2012/0212353 A1* | 8/2012 | Fung | B60W 30/08 |
| | | | 340/905 |
| 2015/0066284 A1* | 3/2015 | Yopp | B60W 30/00 |
| | | | 701/29.2 |
| 2015/0092056 A1 | 4/2015 | Rau et al. | |
| 2019/0064800 A1* | 2/2019 | Frazzoli | G05D 1/0088 |

OTHER PUBLICATIONS

"BMW Autonomous Driving" http://www.motoring.com.au/bmw-autonomous-driving-36983/Accessed/Published: Jun. 6, 2013.

* cited by examiner

VEHICLE SYSTEMS AND METHODS FOR DETECTING AND MITIGATING AN INCAPACITATED DRIVER

TECHNICAL FIELD

Embodiments described herein generally relate to vehicle systems and, more specifically, to vehicle systems that determine a specific cause of a driver's incapacitation and operate a vehicle in an at least partially autonomous driving mode based on the specific cause of incapacity.

BACKGROUND

Incapacitated drivers are usually unable to operate motor vehicles effectively because of their reduced motor functions and cognitive ability. Some characteristics of incapacitated driving include, but are not limited to, operating a vehicle at too fast or slow of a speed, being unable to avoid obstacles, reduced reaction time, swerving in and out of lanes, and the like. Sometimes a driver may not realize that he or she is incapacitated, or may underestimate the level of incapacitation and decide to operate a vehicle. In some instances, a driver may unintentionally become incapacitated by a lack of sleep, by the side effects of medication, or from mental stress.

The specific cause of a driver's incapacitation may affect how a vehicle is operated. For example, a driver who is drowsy from a lack of sleep may operate a vehicle in a different manner when compared to an operator who is intoxicated by alcohol. More specifically, a driver intoxicated by alcohol often operates the vehicle at too slow of a speed. The intoxicated driver may also have a delayed reaction to specific events such as moving out of the way of an impending obstacle. In contrast, sometimes a drowsy driver may fall asleep for a few seconds while still operating the vehicle. As a result, the drowsy driver does not attempt to brake or swerve out of the way of an impending obstacle.

SUMMARY

In one embodiment, a vehicle includes one or more sensors, one or more processors, and one or more non-transitory memory modules communicatively coupled to the one or more processors. The memory modules store machine-readable instructions that, when executed, cause the one or more processors to receive one or more signals output by the one or more sensors and determine a driver of the vehicle is incapacitated based on the one or more signals by the one or more sensors. In response to determining the driver is incapacitated, the processors are cause to determine a specific type of incapacitation of the driver based on the one or more signals by the one or more sensors. The processors may select an individual vehicle control profile based on at least on the specific type of incapacitation. The processors also switch control of the vehicle from a manual driving mode to an at least partially autonomous driving mode. The at least partially autonomous driving mode operates the vehicle based on the individual vehicle control profile.

In another embodiment, a vehicle includes one or more sensors, one or more processors, and one or more non-transitory memory modules communicatively coupled to the one or more processors. The memory modules store machine-readable instructions that, when executed, cause the one or more processors to receive one or more signals output by the one or more sensors to determine a data stream and determine a driver of the vehicle is incapacitated based on the data stream. In response to determining the driver is incapacitated, the processors are caused to compare the data stream with a data pattern associated with a vehicle control profile. In response to determining that the data stream is substantially similar to the data pattern, the processors are caused to select the vehicle control profile as an individual vehicle control profile. Finally, the processors are caused to switch control of the vehicle from a manual driving mode to an at least partially autonomous driving mode. The at least partially autonomous driving mode operates the vehicle based on the individual vehicle control profile.

In yet another embodiment, a method of determining a driver of a vehicle is incapacitated is disclosed, and includes receiving, by a computer, one or more signals output by one or more sensors. In response to receiving the one or more signals, the method includes determining that the driver of the vehicle is incapacitated based on the one or more signals by the one or more sensors. In response to determining the driver is incapacitated, the method includes determining a specific type of incapacitation of the driver based on the one or more signals by the one or more sensors. The method also includes selecting an individual vehicle control profile from a plurality of vehicle control profiles saved in a memory of the computer based on at least on the specific type of incapacitation. Finally, the method includes switching control of the vehicle from a manual driving mode to a at least partially autonomous driving mode. The at least partially autonomous driving mode operates the vehicle based on the individual vehicle control profile.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
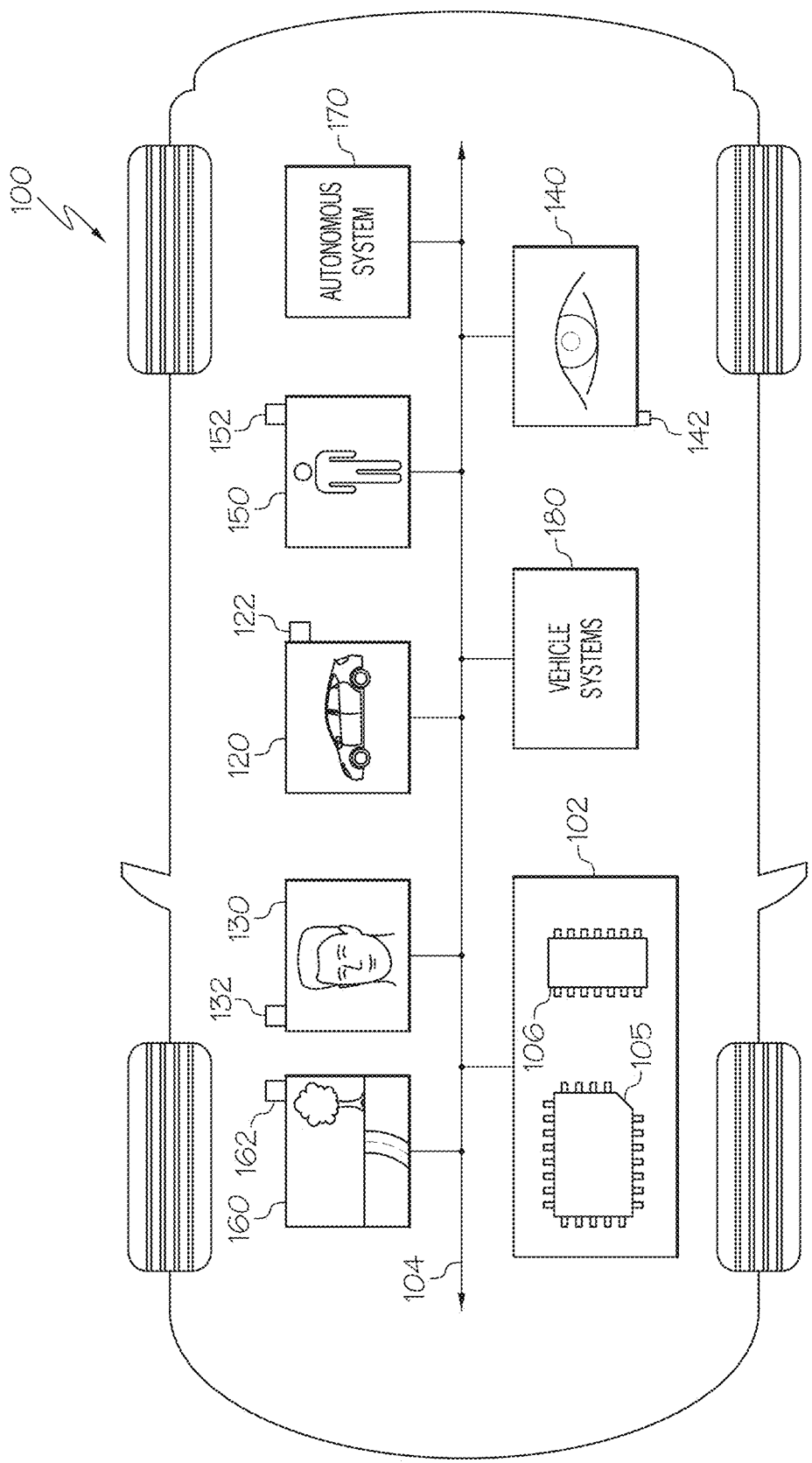
FIG. 1 schematically depicts an example vehicle system for detecting that a driver is incapacitated as well as a specific type of incapacitation, according to one or more embodiments shown and described herein.

The embodiments disclosed herein are directed to vehicle systems for detecting and mitigating the effects of an incapacitated driver operating a vehicle. Embodiments described herein may determine if a driver is incapacitated based on output generated by one or more sensors. More specifically, the vehicle system includes one or more sensors to monitor various attributes of the vehicle, the driver, and the environment surrounding the driver to determine if the driver may be incapacitated. In addition to determining whether the driver is incapacitated, the system may also determine a specific cause of the driver's intoxication based on the output generated by the driver, the vehicle, and the surrounding environment.

It should be appreciated that the driver may be incapacitated for a variety of reasons such as, but not limited to, alcohol intoxication, drug intoxication, medication side effects, lack of sleep, or state of mind. Each specific cause of incapacitation may cause the driver to operate the vehicle in a different manner. In one non-limiting embodiment, the system may also be able to determine subcategories for a specific type of incapacitation. For example, the system may determine that the driver is incapacitated due to drug intoxication as well as a particular type of intoxication that is created by ingesting a specific drug (e.g., the system may be able to distinguish the differences between a driver who has ingested opiates from a driver who has ingested marijuana).

Once the system determines the specific cause of the driver's intoxication, a vehicle control profile that corresponds to the specific cause of intoxication is selected, and may be referred to as an individual vehicle control profile. The individual vehicle control profile is configured to control the vehicle in an at least partially autonomous driving mode based on the specific vehicle control profile. In one embodiment, when operating in a semi-autonomous driving mode, the vehicle is controlled based on both human input and computer-assisted control.

The system may monitor at least one vehicle system while operating in the semi-autonomous driving mode to determine if the driver is about to attempt a maneuver. In response to determining the driver is about to attempt a maneuver, the system operates the vehicle autonomously to perform the maneuver. For instance, if the system determines the driver is attempting to make a turn at an intersection based on a position of a steering wheel, then the electronic control unit may control one or more aspects of the vehicle operation, such as steering, while the driver performs the turn through the intersection. Accordingly, the system may perform maneuvers that have been initiated by the driver when operating in the semi-autonomous driving mode. In other words, the vehicle is operated with respect to the driver's volition while operating in the semi-autonomous driving mode.

It should be appreciated that the driving maneuvers performed while the vehicle is operating in the semi-autonomous mode may normally be difficult for a driver with the same cause of incapacitation to perform. For instance, if the system determines that the driver is incapacitated due to alcohol intoxication, then the system selects a vehicle control profile that accounts for specific driver attributes that are normally observed when a driver under the influence of alcohol operates a vehicle. The vehicle is then operated in the semi-autonomous driving mode based on the selected vehicle control profile.

The vehicle systems for operating a vehicle based on a specific cause of driver intoxication will be described in more detail herein with specific reference to the corresponding drawings.

Referring now to FIG. 1, an example vehicle 100 configured to determine a specific cause of a driver's incapacitation and operate the vehicle 100 in an at least partially autonomous driving mode based on the specific cause of incapacity is schematically depicted. The vehicle 100 may be any passenger vehicle such as, for example, a terrestrial, aquatic, and/or airborne vehicle. The vehicle 100 may include a communication path 104, an electronic control unit 102, a vehicle operating condition sensor system 120, a driver detection system 130, a driver eye monitoring system 140, a biological function monitoring system 150, an external sensor system 160, an autonomous control system 170, and one or more vehicle systems 180. The electronic control unit 102 may include one or more processors 105, and one or more memory modules 106.

As explained in greater detail below, the electronic control unit 102 may determine that the driver of the vehicle 100 is incapacitated as well as the specific type of incapacitation based on at least one of an operational signal generated by the vehicle operating condition sensor system 120, a driver position signal generated by the driver detection system 130, an eye signal generated by the driver eye monitoring system 140, a body signal generated by the biological function monitoring system 150, and/or an environmental signal generated by the external sensor system 160. The electronic control unit 102 may also select a vehicle control profile from a plurality of vehicle control profiles that are saved in the one or more memory modules 106. The selected vehicle control profile corresponds to the specific cause of incapacitation of the driver. In response to selecting a specific vehicle control profile, the electronic control unit 102 may instruct the autonomous control system 170 to operate the vehicle in a semi-autonomous mode.

Still referring to FIG. 1, the communication path 104 that provides data interconnectivity between various modules is disposed within the vehicle 100. Specifically, each of the modules may operate as a node that may send and/or receive data. In some embodiments, the communication path 104 includes a conductive material that permits the transmission of electrical data signals to processors, memories, sensors, and actuators throughout the vehicle 100. In another embodiment, the communication path 104 may be a bus, such as, for example, a LIN bus, a CAN bus, a VAN bus, and the like. In further embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. Moreover, the communication path 104 may be formed from a combination of mediums capable of transmitting signals. In some embodiments, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The electronic control unit 102 may be any computing device. For instance, the electronic control unit 102 may be any type of vehicle-installed, handheld, desktop, or other form of single computing device, or may be composed of multiple computing devices. The electronic control unit 102 includes one or more processors 105 for controlling operations of the electronic control unit communicatively coupled with one or more memory modules 106 over the communication path of the vehicle 100. The one or more processors 105 may include any device capable of executing machine-readable instructions stored on a non-transitory computer-readable medium. Accordingly, each of the one or more processors 105 may include a controller, an integrated circuit, a microchip, a computer, and/or any other computing device.

The electronic control unit 102 further includes one or more memory modules 106 communicatively coupled to the one or more processors 105 over the communication path 104. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the electronic control unit 102 and/or external to the electronic control unit 102. The one or more memory modules 106 may be configured to store one or more pieces of logic as described in more detail below. The embodiments described herein may utilize a distributed computing arrangement to perform any portion of the logic described herein.

In the embodiments described herein, the one or more memory modules 106 and the one or more processors 105 are integral with the electronic control unit 102. However, in another approach at least one of the electronic control unit 102, the one or more memory modules 106, and the one or more processors 105 may be discrete components communicatively coupled to one another without departing from the scope of the present disclosure.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. Logic stored on the one or more memory modules 106 may include, for example, logic to permit the electronic control unit 102 to implement semi-autonomous control of the vehicle 100 based on a selected vehicle control profile, as described below.

The vehicle operating condition sensor system 120 is communicatively coupled to the electronic control unit 102 over the communication path 104. The vehicle operating condition sensor system 120 may include any device configured to detect one or more operating conditions of the vehicle 100. For example, the vehicle operating condition sensor system 120 may detect vehicle speed, acceleration, braking, gear position, position of the steering wheel, and the like. As such, the vehicle operating condition sensor system 120 may include one or more operational condition sensors 122 configured to output the operational signal indicative of one or more operations of the vehicle 100. The operational condition sensors 122 may include, but are not limited to, braking sensors, steering angle sensors, accelerometers, gyroscopes, and/or magnetometers, one or more of which can be combined in an inertial measurement unit (IMU) for measuring direction, speed, acceleration, and yaw. In one embodiment, the operational condition sensors 122 include location sensors that use a global positioning satellite system (GPS) to determine a location of the vehicle 100. In some embodiments, real-time traffic and route information may be received over the GPS.

The driver detection system 130 is communicatively coupled to the electronic control unit 102 over the communication path 104. The driver detection system 130 may include any device configured to detect the presence, movements and/or actions of the driver of the vehicle 100. As such, the driver detection system 130 may include one or more driver detection sensors 132 configured to output the driver position signal indicate of the driver's position and movements. In one embodiment, the driver detection sensors 132 may include one or more cameras directed towards a face and the surrounding area of the driver. In another embodiment, driver detection sensors 132 may output information relevant to the positions of the various driving apparatuses as manipulated by the driver, which is explained in greater detail below and illustrated in FIG. 2.

Referring to FIG. 1, the driver eye monitoring system 140 is communicatively coupled to the electronic control unit 102 over the communication path 104. The driver eye monitoring system 140 may include any device configured to monitor the driver's eye position, movement, blink speed, eyelid position, gaze direction, pupil size, and the like. As such, the driver eye monitoring system 140 may include one or more eye monitoring sensors 142 configured to output the eye signal indicative of various characteristics of the driver's eyes. In some embodiments, the eye monitoring sensors 142 may include one or more cameras to monitor the driver's eyes. The cameras may be based on visible light or infrared light, or may be a hyperspectral sensor. The cameras are configured to monitor characteristics of the driver's eyes such as, but not limited to, blink rate, blink speed, eyelid droop or position, direction and/or duration of focus or gaze to determine incapacitation of the driver. In one embodiment, the eye monitoring sensors 142 may include a pupilometer that measures the size and stability of the driver's pupils.

The biological function monitoring system 150 is communicatively coupled to the electronic control unit 102 over the communication path 104. The biological function monitoring system 150 may include any device configured to monitor biological functions of the driver. As such, the biological function monitoring system 150 may include a plurality of biologic sensors 152 that monitor biological functions of the driver and generate the body signal indicative of one or more bodily functions of the driver. Some examples of the biologic sensors 152 include, but are not limited to, heart rate monitors, breathing monitors, blood pressure monitors, pupilometers that measure the size and stability of the driver's pupils, thermometers that measure a person's body temperature, devices that monitor the blood alcohol level based on a person's breath or sweat, and the like.

The external sensor system 160 is communicatively coupled to the electronic control unit 102 over the communication path 104. The external sensor system 160 may include any device configured to monitor the environmental conditions of the area surrounding the vehicle 100 such as, for example, temperature, precipitation, objects within the vicinity of the vehicle 100, and the like. As such, external sensor system 160 may include a plurality of external sensors 162 that generate the environmental signal that is indicative of the conditions external to the vehicle 100. The external sensors 162 may detect environmental weather conditions, traffic conditions, and road conditions.

In one embodiment, the external sensors 162 may include optical sensors such as, but not limited to, cameras that capture image data using charge coupled devices (CCD), complementary metal oxide semiconductors (CMOS), or similar image capturing elements, and are configured to capture single-spectral images or multi-spectral images. In some embodiments, the external sensors 162 may include radar sensors and/or lidar sensors (using radio or light detection, respectively) that may facilitate in identifying objects in the vicinity of the vehicle 100. Some examples of objects that may be detected include, for example, pedestrians, other vehicles, animals, and obstacles on the road. Some other examples of external sensors 162 include thermometers and barometers for detecting climate changes in the surrounding environment, altimeters for determining altitude, and the like.

The autonomous control system 170 is communicatively coupled to the electronic control unit 102 over the communication path. The autonomous control system 170 is configured to produce control signals to various vehicle hardware systems to perform semi-autonomous control of one or more vehicle functions. As non-limiting examples, the autonomous control system 170 is configured to send control signals to a braking system, a steering system, and a throttle system of the vehicle to autonomously control the vehicle 100 as appropriate. When operated in a semi-autonomous driving mode, the vehicle 100 is controlled based on both human input and computer-assisted logic. More specifically, operation of the vehicle 100 is shared between the driver and the electronic control unit 102. For example, the driver may control certain aspects of the vehicle 100 operation, such as steering, while the electronic control unit 102 controls other aspects of the vehicle 100 operation, such as braking and acceleration. In another embodiment, the driver may have control of the vehicle 100 until the electronic control unit 102 detects that the driver is about to perform a particular maneuver such as, for example, turning at the intersection. The autonomous control system 170 may then instruct one or more vehicle systems to perform the turn. In contrast, when a vehicle is operated manually the driver controls all aspects of operation, without computer assistance.

The vehicle systems 180 are communicatively coupled to the electronic control unit 102 over the communication path 104. The electronic control unit 102 may control the vehicle systems 180 in the semi-autonomous driving mode. Some examples of vehicle systems 180 that may be controlled as the vehicle 100 operates in the semi-autonomous driving mode include, but are not limited to, a propulsion system, a steering system, a stability control system, a navigation system, an energy system, and the like.

It should be appreciated that the driver is initially operating the vehicle 100 in a manual driving mode. When operated in the manual driving mode, the vehicle 100 is controlled based on human input only. However, the electronic control unit 102 switches from the manual driving mode into an at least partially autonomous driving mode. In one embodiment, the vehicle operates in the semi-autonomous driving mode in order to control the vehicle 100 according to the selected vehicle control profile. When the vehicle 100 operates semi-autonomously, the driver may control certain aspects of the vehicle operation while the electronic control unit 102 controls other aspects of the vehicle operation. However, in another embodiment the vehicle 100 may operate autonomously. For example, if the electronic control unit 102 determines the driver is about to make a turn, the vehicle 100 may be completely controlled by the electronic control unit 102, and without input from the driver. However, once the turn is complete, the vehicle may be driven semi-autonomously or manually. As explained in greater detail below, the computer-assisted control of the vehicle 100 is based on the driver's manipulation of one or more driving apparatuses of the vehicle 100. In this way, the vehicle 100 may be operated with respect to the driver's volition.

Figure 2:
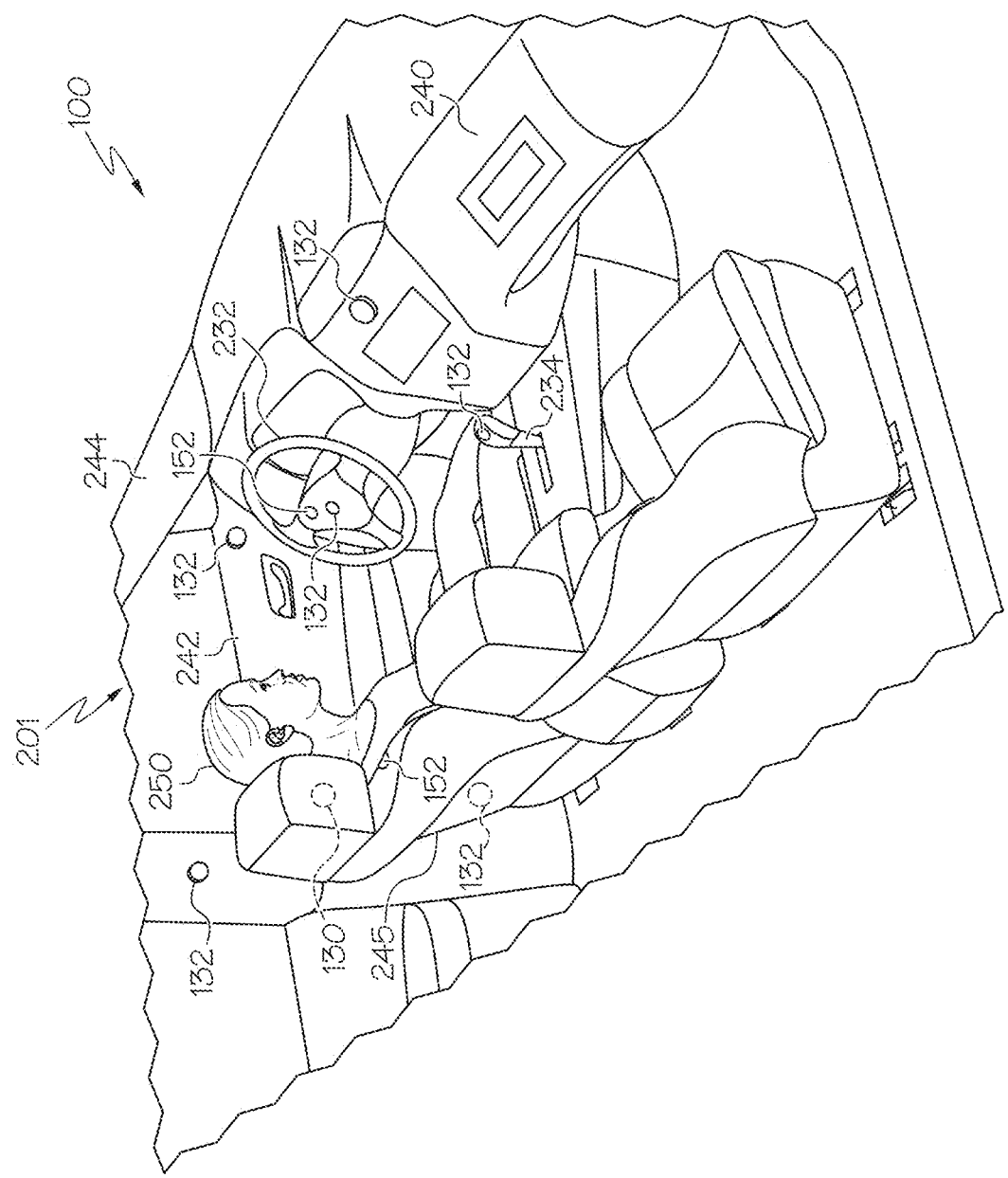
FIG. 2 schematically depicts an interior of the vehicle of FIG. 1, according to one or more embodiments shown and described herein.

Turning now to FIG. 2, an exemplary passenger cabin 201 of the vehicle 100 is illustrated with a driver 250 positioned within a driver seat 245 of the vehicle 100. As seen in FIG. 2, a plurality of driver detection sensors 132 may be placed in a variety of locations throughout the passenger cabin 201. The driver detection sensors 132 may output information relevant to the positions of the various driving apparatuses as manipulated by the driver. In the exemplary embodiment as shown in FIG. 2, one or more driver detection sensors 132 may be coupled to one or more of a steering wheel 232, a gear shifter 234, a brake pedal, and an accelerator pedal (the brake and accelerator pedals are not visible in FIG. 2). More specifically, the driver detection sensors 132 may determine the degree of rotation and rate of speed at which the driver turns the steering wheel 232. The brake pedal position sensors may be configured to monitor the movement or position of the brake pedal (not illustrated) to activate the brakes of the vehicle 100. That is, the brake pedal sensors determine the degree and the rate at which the driver depresses the brake pedal. The accelerator pedal position sensor may be configured to detect the degree at which the driver depresses the accelerator pedal (not illustrated). The transmission position sensor may be configured to indicate a position input of the transmission.

Referring to both FIGS. 1 and 2, the electronic control unit 102 may provide instructions to the autonomous control system 170 to semi-autonomously control the vehicle 100. The semi-autonomous control of the vehicle 100 may be based at least in part on the driver's manipulation of one or more of the driving apparatuses shown in FIG. 2. More specifically, the vehicle 100 may be semi-autonomously controlled based at least in part on the degree of rotation and rate or speed at which the driver turns the steering wheel 232, the movement or position of the brake pedal, the degree at which the driver depresses the accelerator pedal, the position input of the transmission, and the like. The electronic control unit 102 monitors the driving apparatuses (e.g., the steering wheel 232, etc.), and provides instructions to the autonomous control system 170 as to how the vehicle 100 is to be semi-autonomous controlled based on the driver's manipulation. For example, in one embodiment the electronic control unit 102 may instruct the autonomous control system 170 to cause the vehicle 100 to accelerate from a stopped position and turn left in response to determining that the driver is attempting to rotate the steering wheel 232 to the left while depressing the accelerator.

Continuing to refer to FIGS. 1 and 2, the plurality of biologic sensors 152 may be located on or within a driver seat 245 or in locations that are often touched by or make contact with a driver 250 such as, for example, the steering wheel 232 and the driver seat 245. If the driver detection sensors 132 and/or the eye monitoring sensors 142 include one or more cameras, the one or more cameras may be positioned in a variety of locations throughout the passenger cabin 201 to collect image data of the driver 250. Such locations may include the steering wheel 232, a dashboard 240, one or more doors 242, interior vehicle pillars 244, and the like.

The determination of driver incapacity as well as the specific type of incapacity will now be described. Continuing to refer to both FIGS. 1 and 2, in one embodiment the driver detection sensors 132 include one or more cameras (i.e., the cameras are positioned in the steering wheel 232, the dashboard 240, etc.). The driver detection sensors 132 may monitor movement of the driver's head, where the driver position signal is based at least in part on the position and movement of the driver's head. For example, forward to backward movement of the driver's neck may be represented by a pitch angle. When the head axially rotates (i.e., from right to left), this movement may be represented by yaw angle. Finally, right to left bending of the neck may be characterized by roll angle. Although the disclosure describes a specific set of head movements, it should be appreciated that other sets of motions by the head may be monitored as well.

The electronic control unit 102 may determine the orientation of the driver's head relative to same point of reference (e.g., the view of a camera), and determines if movement of the driver's head relative to the point of reference indicates incapacitation of the driver. For example, a driver intoxicated by alcohol may sway or bob his or her head up and down to a degree that is much more than what would be observed when he or she is in a normal, coherent state. In another example, when the driver is drowsy from lack of sleep, the driver may tilt his or her head downwardly to momentarily rest (i.e., the driver nods off to sleep). However, after several seconds the driver usually jerks his or her head back up. In another embodiment, the driver may slump his or her head in a downward motion in response to some types of drug-induced intoxication.

In another embodiment, the driver detection sensors 132 are located throughout the passenger cabin 201 and may generate one or more output signals indicative of the position of the particular driving apparatus as manipulated by the driver. More specifically, the output signals may indicate that the driver is incapacitated based on the driver's particular style or approach for manipulating a particular driving apparatus. For example, the output signal may indicate that the driver 250 is manipulating the steering wheel 232 improperly and in such a manner to indicate he or she is likely incapacitated. More specifically, the driver may move the steering wheel 232 such that the vehicle 100 may swerve or weave on the road when the driver is intoxicated by alcohol. In another example, a turn radius, speed, and the like of the steering wheel 232 may be indicative of alcohol intoxication as the driver manipulates the vehicle 100 through a turn (e.g., such as through an intersection). Although alcohol intoxication, drowsiness, and drug intoxication are described, it should be appreciated that the disclosure is not limited to determining only these specific types of driver incapacitation based on the driver detection sensors 132.

The eye monitoring sensors 142 may generate eye signals indicative of one or more conditions of the driver's eyes that may indicate incapacitation. For example, the eye signals may indicate the driver 250 is drowsy from a lack of sleep based on eyelid position, eye blink and speed, and gaze direction. More specifically, when the driver 250 is drowsy the eye monitoring sensors 142 may detect that the driver's eyelids are drooping or have stayed closed for a longer duration of time than when he or she is alert. The eye monitoring sensors 142 may also detect that the driver's eyelids close and open at a slower velocity than when he or she is alert, or that the driver's gaze does not focus or turn to events are quickly when compared to when the driver 250 is alert.

In another example, when the driver 250 is intoxicated by alcohol or has ingested stimulants such as amphetamine, then the camera may detect the driver's pupils have a delayed or lack of reaction to light or are dilated. In still another example, the eye monitoring sensors 142 may detect that the driver's pupils are extremely constricted (which may be referred to as pinpoint pupils) and/or the eyes of the driver are rolling back, which may be indicative of opioid use. Although drowsiness, alcohol intoxication, stimulant intoxication, and opioid intoxication are described, it should be appreciated that the disclosure is not limited to determining only these specific types of driver incapacitation based on the conditions of the driver's eyes.

The biologic sensors 152 may generate one or more body signals that indicate the driver of the vehicle 100 may be incapacitated as well. For example, the body signal may indicate a relatively slow heart rate, stable pupil size, and a decreased respiration rate of the driver, which may indicate that the driver is incapacitated due to a lack of sleep or is drowsy. Alternatively, an increased heart rate, pupillary dilation, and increased respiration rate of the driver 250 may indicate the driver 250 is under extreme stress or mental anguish. In still another embodiment, the body signal may indicate that the driver is intoxicated by alcohol based on the blood alcohol level monitored by a breathalyzer or similar device to measure blood alcohol levels.

In still another embodiment, the plurality of external sensors 162 generate the environmental signal that may indicate the driver is incapacitated based on the conditions external to the vehicle 100. For example, the external sensors 162 may detect traffic signals and traffic patterns such as images of traffic lights, markings on the road, or traffic signs may be captured by optical sensors, and are processed by the electronic control unit 102. For example, the environmental signal may indicate the speed limit based on a particular road sign. In response to receiving the environmental signal, the electronic control unit 102 may then determine that the driver is driving much more slowly than the posted speed limit. In one embodiment, the external sensors 162 may include one or more optical sensors configured to detect the lane markings on a road as the vehicle 100 is operating. In one example, the environmental signal may indicate that the vehicle 100 is travelling in and out of the lanes. Accordingly, the electronic control unit 102 may determine the driver is incapacitated.

In one embodiment, the electronic control unit 102 may determine one or more subcategories that exist for a particular type of incapacitation. The subcategories may define more detailed characteristics that are typically observed when a driver is incapacitated for a specific reason or by a particular substance. For example, the electronic control unit 102 may determine one or more subcategories for drugs, where each subcategory may define the characteristics that are normally observed when a driver is intoxicated due to a particular type of drug. More specifically, in one example a subcategory may exist for a driver who has ingested drugs such as cocaine or amphetamines. It is to be appreciated that the driver typically exhibits very large or dialateed pupils that may be measured by a pupilometer when injecting these substances. Another subcategory may also exist for a driver who has ingested an opiate such as heroin. Unlike cocaine and amphetamines, a driver may exhibit constricted pupils (i.e., pinpoint pupils) when ingesting opiates. In still another example, s subcategory may exist for driver who has ingested marijuana. Drivers who ingest marijuana may exhibit heavy or droopy eyelids and/or may operate the vehicle 100 at abnormally slow speed or activate the incorrect turn signal when turning. In another embodiment, one or more subcategories may exist for the mental state of the driver. For example, the subcategories may include extreme anger, sadness, extreme mental stress, and the like.

Once the electronic control unit 102 determines the specific cause of the driver's intoxication, the electronic control unit 102 selects a vehicle control profile that corresponds to the specific cause of intoxication. The vehicle control profiles are saved in the one or more memory modules 106, where each vehicle control profile corresponds to a unique or specific cause of incapacitation. The vehicle control profiles are each configured to control the vehicle 100 at least partially autonomously based on the cause of the driver's intoxication. More specifically, each vehicle control profile includes instructions indicating how the vehicle 100 is semi-autonomously operated based on the specific type of incapacitation.

The vehicle control profiles saved in the one or more memory modules 106 of the electronic control unit 102 may be determined based on various machine learning techniques. More specifically, machine learning may be used to determine patterns and features that are common between a group of drivers who share the same type of incapacitation. For example, the electronic control unit 102 may determine specific patterns that a majority of drunk drivers may exhibit while operating a vehicle. That is, machine learning may determine some characteristics of a drunk driver such as, but not limited to, swerving between the lanes in the road, swaying or bobbing of the driver's head, blood alcohol level, and the like.

The electronic control unit 102 may determine the vehicle control profiles based on either supervised or unsupervised machine learning. In supervised machine learning, the electronic control unit 102 may determine that a driver is incapacitated based on human interpretation (i.e., data and record instances of incapacitated driving events). More specifically, the electronic control unit 102 may monitor operation of the driver, the vehicle 100, and the environment surrounding the vehicle 100 by a data stream that indicates real-time operation of the vehicle. The electronic control unit 102 may then compare the data being generated by the vehicle 100 with experimental data saved in the one or more memory modules 106. The experimental data saved in one or more memory modules 106 may be flagged or tagged to indicate that the experimental data corresponds to at least one qualifying event. The qualifying event may be any incident that would normally occur in response to the driver operating the vehicle 100 incapacitated. Some examples of a qualifying event include, but are not limited to, being pulled over and/or arrested by law enforcement, being involved in an accident, driving off the road, driving into an object located in the surrounding environment (e.g., a tree or parked car), running through a traffic signal or stop sign, and the like.

In response to determining that the data generated by the vehicle 100 is substantially similar to the data included within the qualifying event, the electronic control unit 102 may save the data that was generated prior to the qualifying event in the one or more memory modules 106, and builds one or more vehicle control profiles based on the data. For example, if a driver is arrested for drunk driving or driving under the influence of an illegal substance (e.g., opiates, marijuana, etc.), then the data recorded prior to the driver's arrest may be used to build the vehicle control profiles since it is known that the driver was incapacitated. In another example, if the driver is involved in an accident based on some form of incapacitation (e.g., the driver feel asleep while the vehicle 100 was operating) then the data recorded prior to the accident may be used to build the vehicle control profiles.

In another approach, the electronic control unit 102 may build the vehicle control profiles based on unsupervised machine learning. When analyzing data using the unsupervised approach, the electronic control unit 102 automatically tags or classifies the data as being related to driver incapacitation in response to determining one or more data points included within the data stream are at least equal to a threshold value. For example, one simple approach to determine if a driver is drunk may be based on blood alcohol level, where the electronic control unit 102 may determine the driver is intoxicated if his or her blood alcohol content is above a threshold value. In one embodiment, the threshold blood alcohol level may be about 0.08% before the driver is determined to be impaired by alcohol, however the threshold level may be set to other values as well. It should also be appreciated that the threshold value may represent a level of confidence or certainty that the driver is in incapacitated.

The electronic control unit 102 may determine that the driver of the vehicle 100 is incapacitated as well as a specific cause of incapacitation based on data patterns saved in the one or more memory modules 106 of the electronic control unit 102, where one or more data patterns may be associated with a particular vehicle control profile. For example, if the data that is currently generated by the vehicle 100, which is monitored by the sensors illustrated in FIGS. 1 and 2, exhibits patterns that are substantially similar to a particular data pattern that is associated with a vehicle control profile for an extremely angry or enraged driver, then the electronic control unit 102 would determine that the driver is likely enraged. Accordingly, the electronic control unit 102 may then select the vehicle control profile that corresponds to an enraged driver, and the vehicle 100 may be controlled semi-autonomously. It should be appreciated that an angry or engaged driver is described for illustrative purposes, and the disclosure is not limited to any specific type of incapacitation that a driver may experience.

In one embodiment, the vehicle control profiles may indicate that the driver is incapacitated based on a confidence level, where the confidence level represents the degree of accuracy of a particular vehicle control profile. For example, a vehicle control profile with an average level of certainty for an angry driver may only include a relative confidence level of about fifty percent. In contrast, another vehicle control profile corresponding to a drunk driver may include a relatively high degree of certainty and includes a confidence level of about ninety percent. Thus, the electronic control unit 102 may weight or otherwise consider the confidence level of the data included with one or more vehicle control profiles when determining the type of incapacitation of a driver.

In one embodiment the confidence level may need to be at least equal to a threshold level, where the threshold level may represent some degree of confidence that the vehicle control profile is accurate. Accordingly, in response to determining the vehicle control profile is associated with a confidence level that is below the threshold, the electronic control unit 102 selects an alternative vehicle control profile instead. Likewise, in response to determining the vehicle control profile is associated with a confidence level that is at least equal to the threshold level, the electronic control unit 102 selects the vehicle control profile.

The individual vehicle control profile is configured to control the vehicle at least partially autonomously complete one or more driving maneuvers. In one embodiment, the driving maneuvers completed as the vehicle 100 operates in the semi-autonomous driving mode may normally be difficult or challenging for a driver with the same cause of incapacitation to perform. For instance, if the system determines that the driver is incapacitated due to alcohol intoxication, then the system selects a vehicle control profile that accounts for specific driving attributes that are normally challenging for a driver under the influence of alcohol to complete such as, for example, changing lanes and maintaining the vehicle 100 in a specific lane without excessive swerving. The vehicle is then operated at least partially autonomously based on the individual vehicle control profile.

In one particular embodiment, the electronic control unit 102 may build the vehicle control profiles based on the behavior of one particular driver. This is because some individuals almost always exhibit certain behaviors when incapacitated. For example, many people almost always perform certain behaviors when intoxicated by alcohol. More specifically, in one non-limiting example an individual may always listen to a particular genre of music, a specific radio station, or a unique musical group when he or she is intoxicated by alcohol. The individual may also exhibit other behaviors as well, such as forgetting to turn on headlights of the vehicle when it is dark outside, or failing to change lanes properly without excessive swerving. Accordingly, the vehicle control profile may be built on these features that are unique to the particular individual.

Figure 3:
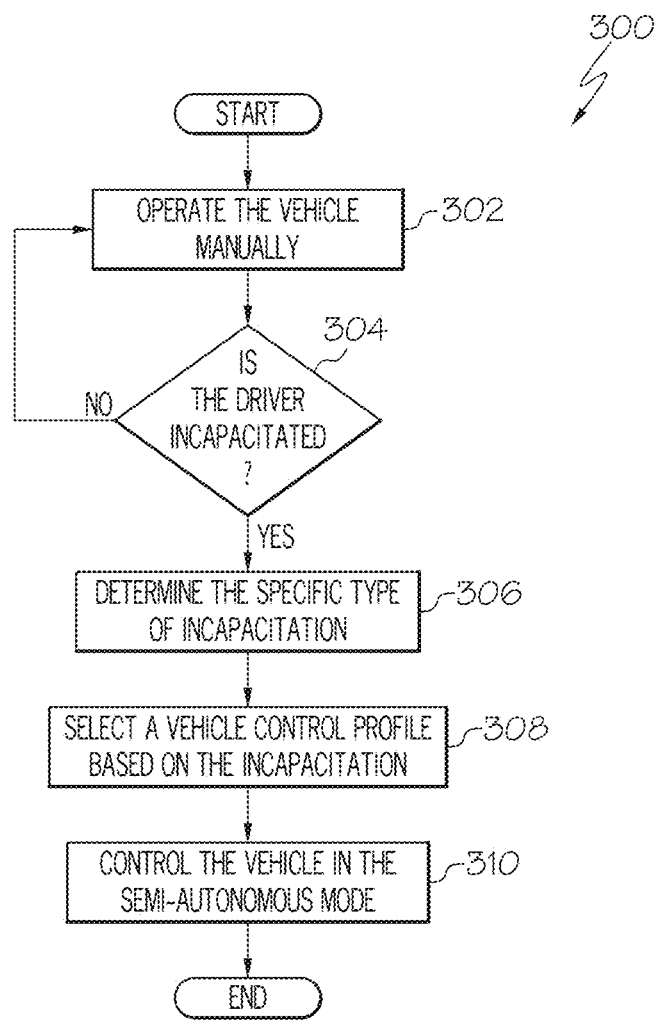
FIG. 3 illustrates a flow diagram of an exemplary process for determining that a driver is incapacitated and the specific type of incapacitation, according to one or more embodiments shown and described herein.

Referring now to FIG. 3, a flowchart 300 depicting a method for determining that the driver of the vehicle 100 is incapacitated, and selecting a specific vehicle control profile based on a specific cause for the driver's incapacitation is shown. It should be understood that embodiments are not limited by the order of steps of the flowchart 300 of FIG. 3.

Referring to FIGS. 1, 2, and 3, in decision block 302 the driver operates the vehicle 100 in the manual driving mode while the electronic control unit 102 monitors one or more sensors that indicate the behavior of the driver, the vehicle 100, and the environment surrounding the vehicle 100. For example, in the embodiment as shown in FIG. 1, the electronic control unit 102 may monitor the operational signal generated by the vehicle operating condition sensor system 120, the driver position signal generated by the driver detection system 130, the eye signal generated by the driver eye monitoring system 140, the body signal generated by the biological function monitoring system 150, and/or the environmental signal generated by the external sensor system 160 electronic control unit 102. The method may then proceed to decision block 304.

In decision block 304, the electronic control unit 102 may determine if the driver is incapacitated based on the monitoring of the signals described in block 302. As mentioned above, the electronic control unit 102 may determine the driver is incapacitated based on several characteristics of the driver and/or the vehicle 100 exceeding a threshold value. Alternatively, the electronic control unit 102 may determine the driver is incapacitated based on data patterns saved in the one or more memory modules 106 of the electronic control unit 102. In response to determining the driver is not incapacitated, the method may return to block 302. However, in response to determining that the driver is incapacitated, the method may proceed to block 306.

In block 306, the electronic control unit 102 may determine a specific type of incapacitation experienced by the driver. As explained above, the driver may be incapacitated for a variety of reasons such as, for example, alcohol intoxication, drug intoxication, mental stress, side effects of medicine, and the like. Furthermore, in one embodiment the electronic control unit 102 may also determine a subcategory of the incapacitation as well. The method may then proceed to block 308.

In block 308, the electronic control unit 102 may select a specific vehicle control profile saved in the one or more memory modules 106 that corresponds to the particular type of incapacitation determined in block 306. The method may then proceed to block 310.

In block 310, the electronic control unit 102 may instruct the autonomous control system 170 to operate the vehicle in the semi-autonomous driving mode based on the vehicle control profile determined in block 308. The method may then terminate.

It should now be understood that embodiments described herein are directed towards systems for determining if a driver operating a vehicle is incapacitated as well as the specific type of incapacitation of the driver. The system may also select a vehicle control profile that corresponds to a particular type of incapacitation, and controls the vehicle semi-autonomously based on the vehicle control profile. It should be appreciated that incapacitated drivers are usually unable to operate motor vehicles effectively because of their reduced motor functions and cognitive ability. The disclosed system may address this issue by providing semi-autonomous control of the vehicle. Furthermore, since the ability of the driver to operate a vehicle while impaired may vary by the specific type of incapacitation, the disclosed system may address these differences by controlling the vehicle based on a specific vehicle control profile that corresponds to a particular type of incapacity.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system for a vehicle, the system comprising:
   one or more sensors;
   one or more processors; and
   one or more non-transitory memory modules communicatively coupled to the one or more processors and storing machine-readable instructions that, when executed, cause the one or more processors to perform at least the following:
   receive one or more signals output by the one or more sensors;
   determine a driver of the vehicle is incapacitated based on the one or more signals output by the one or more sensors;
   in response to determining the driver is incapacitated, determine a specific type of incapacitation of the driver based on the one or more signals output by the one or more sensors;
   select an individual vehicle control profile from a plurality of vehicle control profiles based on the specific type of incapacitation;
   switch control of the vehicle from a manual driving mode to an at least partially autonomous driving mode, wherein the at least partially autonomous driving mode operates the vehicle based on the individual vehicle control profile;

monitor one or more driving apparatuses as manipulated by the driver;

determine that the driver is about to perform one or more driving maneuvers based on the one or more signals output by the one or more sensors; and in response to determining that the driver is about to perform the one or more driving maneuvers, control one or more vehicle systems in order to perform the one or more driving maneuvers in the at least partially autonomous driving mode.

2. The system for a vehicle of claim 1, wherein the machine-readable instructions further cause the one or more processors to:

monitor the one or more signals output by the one or more sensors to determine a data stream;

compare the data stream with a data pattern associated with a vehicle control profile; and in response to determining that the data stream is substantially similar to the data pattern, select the vehicle control profile as the individual vehicle control profile.

3. The system for a vehicle of claim 2, wherein the machine-readable instructions further cause the one or more processors to:

determine the vehicle control profile is associated with a confidence level;

in response to determining the vehicle control profile is associated with a confidence level below a threshold, select an alternative vehicle control profile as the individual vehicle control profile; and in response to determining the vehicle control profile is associated with a confidence level that is at least equal to the threshold, select the vehicle control profile as the individual vehicle control profile.

4. The system for a vehicle of claim 1, wherein the one or more sensors further comprise at least one of the following:

a vehicle operating condition sensor system configured to output an operational signal;

a driver detection system configured to output a driver detection signal;

a driver eye monitoring system configured to output a body signal;

a biological function monitoring system configured to output a body signal; and an external sensor system configured to output an environmental signal.

5. The system for a vehicle of claim 1, wherein the machine-readable instructions further cause the one or more processors to:

monitor the one or more signals output by the one or more sensors to determine a data stream;

compare the data stream with experimental data saved in the one or more non-transitory memory modules, wherein the experimental data is tagged to indicate at least one qualifying event;

in response to determining that the data stream is substantially similar to the experimental data included within the qualifying event, save the data stream generated prior to the qualifying event in the one or more non-transitory memory modules; and build one or more vehicle control profiles based on the data stream.

6. The system for a vehicle of claim 1, wherein the machine-readable instructions further cause the one or more processors to:

monitor the one or more signals output by the one or more sensors to determine a data stream;

compare one or more data points of the data stream to a threshold value;

in response to determining the one or more data points included within the data stream are at least equal to the threshold value, classify the data stream as being related to driver incapacitation; and build one or more vehicle control profiles based on the data stream.

7. The system for a vehicle of claim 1, wherein the specific type of incapacitation is one of alcohol intoxication, drug intoxication, medication side effects, lack of sleep, and a state of mind.

8. The system for a vehicle of claim 1, wherein the machine-readable instructions further cause the one or more processors to:

determine one or more subcategories that exist for the specific type of incapacitation; and select the individual vehicle control profile based on the one or more subcategories.

9. A system for a vehicle, the system comprising:

one or more sensors;

one or more processors; and one or more non-transitory memory modules communicatively coupled to the one or more processors and storing machine-readable instructions that, when executed, cause the one or more processors to perform at least the following:

receive one or more signals output by the one or more sensors to determine a data stream;

determine a driver of the vehicle is incapacitated based on the data stream;

in response to determining the driver is incapacitated, compare the data stream with a data pattern associated with a vehicle control profile;

in response to determining that the data stream is substantially similar to the data pattern, select the vehicle control profile as an individual vehicle control profile; and switch control of the vehicle from a manual driving mode to a at least partially autonomous driving mode, wherein the at least partially autonomous driving mode operates the vehicle based on the individual vehicle control profile.

10. The system for a vehicle of claim 9, wherein the machine-readable instructions further cause the one or more processors to:

determine the vehicle control profile is associated with a confidence level;

in response to determining the vehicle control profile is associated with a confidence level below a threshold, select an alternative vehicle control profile as the individual vehicle control profile; and in response to determining the vehicle control profile is associated with a confidence level that is at least equal to the threshold, select the vehicle control profile as the individual vehicle control profile.

11. The system for a vehicle of claim 9, wherein the machine-readable instructions further cause the one or more processors to:

monitor one or more driving apparatuses as manipulated by the driver;

determine that the driver is about to perform one or more driving maneuvers based on the data stream; and in response to determining that the driver is about to perform the one or more driving maneuvers, control one or more vehicle systems in order to perform the one or more driving maneuvers in the at least partially autonomous driving mode.

12. The system for a vehicle of claim 9, wherein the one or more sensors further comprise at least one of the following:
    a vehicle operating condition sensor system configured to output an operational signal;
    a driver detection system configured to output a driver detection signal;
    a driver eye monitoring system configured to output a body signal;
    a biological function monitoring system configured to output a body signal; and
    an external sensor system configured to output an environmental signal.

13. The system for a vehicle of claim 9, wherein the machine-readable instructions further cause the one or more processors to:
    compare the data stream with experimental data saved in the one or more non-transitory memory modules, wherein the experimental data is tagged to indicate at least one qualifying event;
    in response to determining that the data stream is substantially similar to the experimental data included within the qualifying event, save the data stream generated prior to the qualifying event in the one or more non-transitory memory modules; and
    build one or more vehicle control profiles based on the data stream.

14. The system for a vehicle of claim 9, wherein the machine-readable instructions further cause the one or more processors to:
    compare one or more data points of the data stream to a threshold value; and
    in response to determining the one or more data points included within the data stream are at least equal to the threshold value, classify the data stream as being related to driver incapacitation; and
    build one or more vehicle control profiles based on the data stream.

15. A method for determining that a driver of a vehicle is incapacitated, the method comprising:
    receiving, by a computer, one or more signals output by one or more sensors;
    determining a data stream from the one or more signals output by the one or more sensors;
    in response to determining the data stream, determining that the driver of the vehicle is incapacitated;
    in response to determining the driver is incapacitated, comparing the data stream with a data pattern associated with a vehicle control profile;
    in response to determining that the data stream is substantially similar to the data pattern, selecting the vehicle control profile as an individual vehicle control profile; and
    switching control of the vehicle from a manual driving mode to a at least partially autonomous driving mode, wherein the at least partially autonomous driving mode operates the vehicle based on the individual vehicle control profile.

16. The method of claim 15, further comprising:
    determining the vehicle control profile is associated with a confidence level;
    in response to determining the vehicle control profile is associated with a confidence level below a threshold, selecting an alternative vehicle control profile as the individual vehicle control profile; and
    in response to determining the vehicle control profile is associated with a confidence level that is at least equal to the threshold, selecting the vehicle control profile as the individual vehicle control profile.

17. The method of claim 15, further comprising:
    monitoring one or more driving apparatuses as manipulated by the driver;
    determining that the driver is about to perform one or more driving maneuvers based on the data stream; and
    in response to determining that the driver is about to perform the one or more driving maneuvers, controlling one or more vehicle systems in order to perform the one or more driving maneuvers in the at least partially autonomous driving mode.

18. The method of claim 15, further comprising:
    comparing the data stream with experimental data saved in the memory of the computer, wherein the experimental data is tagged to indicate at least one qualifying event;
    in response to determining that the data stream is substantially similar to the experimental data included within the qualifying event, saving the data stream generated prior to the qualifying event in a memory of the computer; and
    building one or more vehicle control profiles based on the data stream.

* * * * *